Sept. 25, 1934.  V. V. COLBY  1,974,642
CUTTING MACHINE
Filed Aug. 4, 1928   4 Sheets-Sheet 4

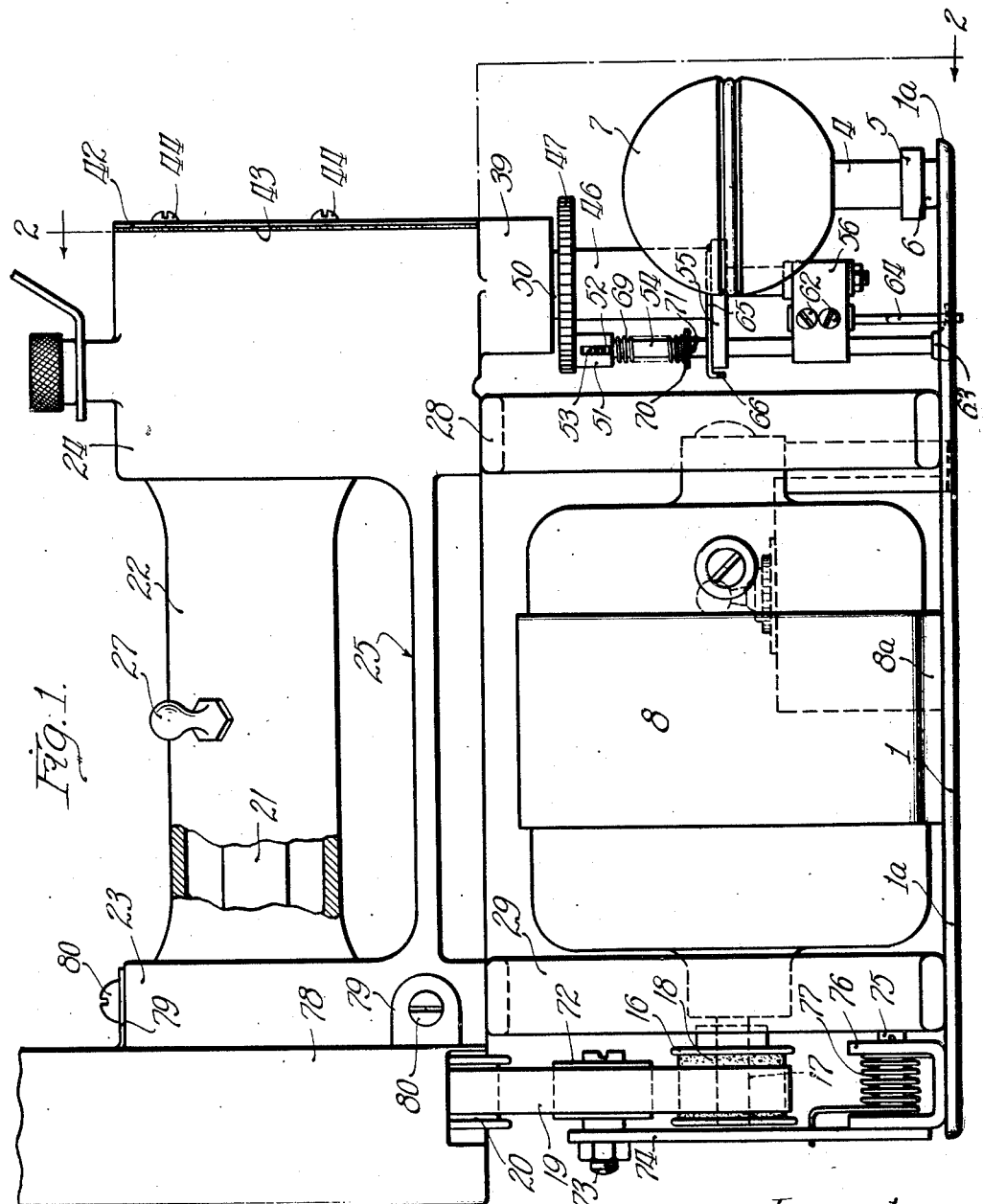

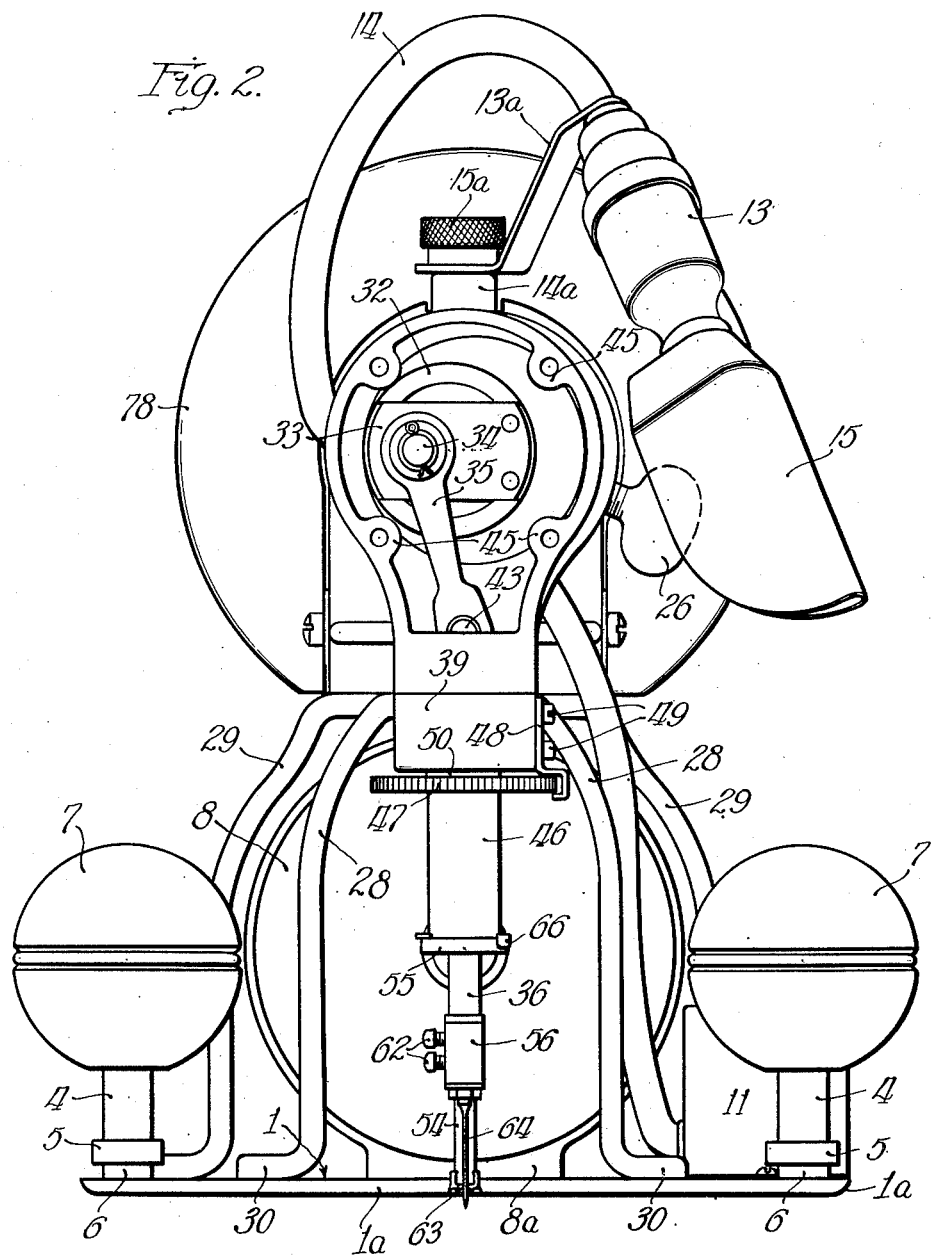

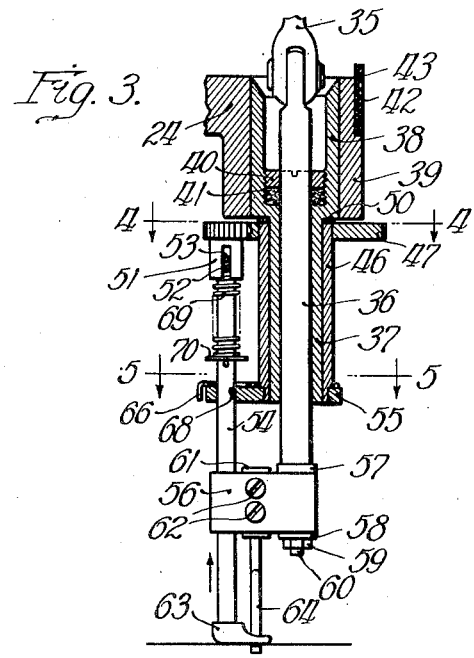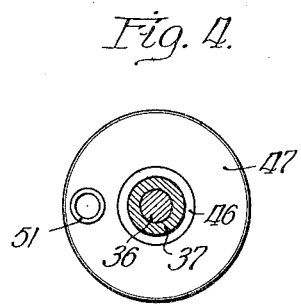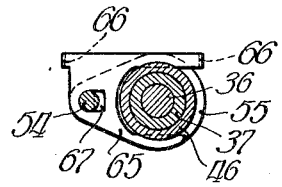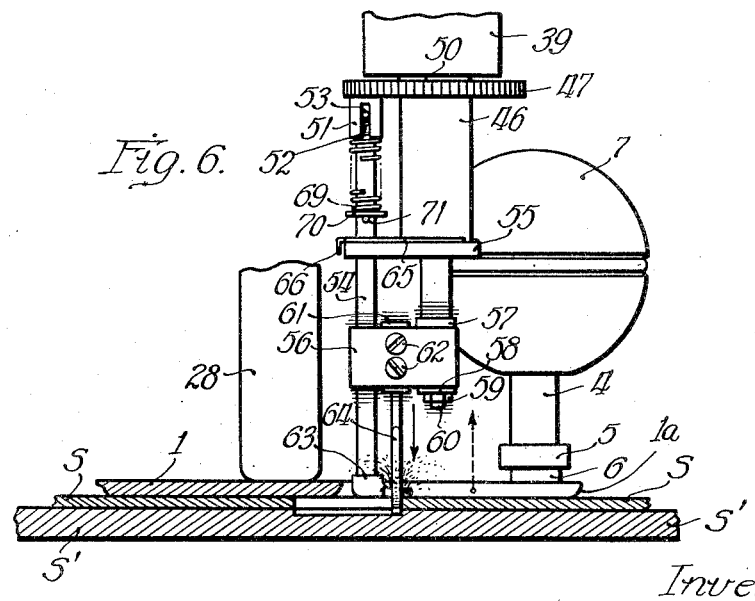

Inventor
Vincent V. Colby
By Mason Jackson Boettcher Dienner
Attys.

Patented Sept. 25, 1934

1,974,642

UNITED STATES PATENT OFFICE 1,974,642

CUTTING MACHINE

Vincent V. Colby, Chicago, Ill., assignor to International Register Company, Chicago, Ill., a corporation of Illinois Application August 4, 1928, Serial No. 297,535

23 Claims. (Cl. 164—75)

This invention relates to cutting machines, and more particularly to machines employing a reciprocating cutter which is mounted for movement about an axis eccentric to the cutting tool.

Machines of this character are used for cutting sheet material of various sorts, such as cloth, boards, composition boards, and numerous other materials in sheet form. It is the common practice to suspend these machines from a fixed support in such manner as to permit movement of the cutting tool along the line of the pattern to be cut, the supporting means being so disposed as to take the greater part of the weight of the machine off of a presser-foot or equivalent member disposed adjacent the cutting tool and moving over the material being cut.

Two machines of this character are disclosed in my Patents 1,492,554, for Scroll cutting machine, issued May 6, 1924, and 1,663,267, for Means for cutting, issued March 20, 1928. In both of these machines the cutting tool is disposed eccentric to a reciprocating plunger or equivalent member upon which this tool is mounted by means of a suitable holder, and a presser-foot contacts the material beyond the tool. In the movement of the presser-foot over the material, this foot trails the tool, due to its eccentric mounting relative to the plunger, and holds the tool in proper position to cut along the line of the pattern. These machines are also provided with a material engaging shoe adjacent the cutting tool which travels upon the material and, in the case of cloth or similar relatively thin material, serves to maintain such material smooth and unwrinkled, facilitating the cutting operation. It has been commonly accepted that the member contacting the material being cut should support but little weight, as this member, due to its small area of contact, if subjected to appreciable weight, would be apt to cause movement and wrinkling of the material, thus defeating the purpose of providing such member.

While the machines of my patents, above identified, have proved to be highly satisfactory, they are open to certain minor objections, such as the necessity for positioning the work under the machine and the limited range of operation of the machine relative to its support.

I have also found that, in machines which are supported by arms, or otherwise, from fixed supports, there is an unavoidable looseness in the supporting means, and it is impossible to maintain the cutting tool perpendicular to the work at all times. This interferes with ease and accuracy of the cutting operation. I have also found that, while the presser-foot follows the line of the pattern with sufficient accuracy when it is permitted to trail freely, it is desirable that means be provided whereby the presser-foot and the tool can be adjusted manually to position the tool accurately on the line at the start of the cutting operation.

It is possible, by providing a supporting member or base of relatively great area, to mount the motor and the entire machine upon such base, this base being moved over the material being cut and facilitating ease and accuracy in the cutting operation. This arrangement has numerous advantages over the cutting machines now in use, above referred to. By mounting the entire machine upon the base plate, this machine can be used in any position desired and the machine can be carried to the work, avoiding the necessity of carrying the work to the machine, and the range or field of movement of the machine is unlimited except by the electric cord or cable by means of which the electric motor is connected into an electric circuit by means of a plug member in a known manner.

Obviously, this electric cord or cable can be of any desired length, so that, for all practical purposes, the machine has unlimited movement over the work. A further advantage of this construction is that the cutting tool is at all times disposed perpendicular to the work assuring ease and accuracy in the cutting operation.

I also provide hand grips or handles associated with the base plate for moving the machine over the work, in conjunction with means for adjusting the cutting tool about the plunger and means for controlling the motor circuit, both of these means being disposed and adapted to be operated by the hands while grasping the handles. This gives complete control over the operation of the machine and the cutting tool, rendering it possible to cut with ease and accuracy along the lines of the selected patterns or designs. Further objects and advantages of my invention will appear from the detailed description.

In the drawings:—

Fig. 1 is a side view of a cutting machine constructed in accordance with my invention;

Fig. 2 is a front view of the machine taken substantially on line 2—2 of Fig. 1;

Fig. 3 is a vertical sectional view through the plunger guiding means and associated parts, parts being shown in elevation;

Fig. 4 is a section taken substantially on line 4—4 of Fig. 3;

Fig. 5 is a section taken substantially on line 5—5 of Fig. 3;

Fig. 6 is a section through the forward portion of the base plate of the machine and two sheets of material, the upper one of which is being cut, the cutting tool, tool holder and associated parts being shown in elevation;

Figure 7:
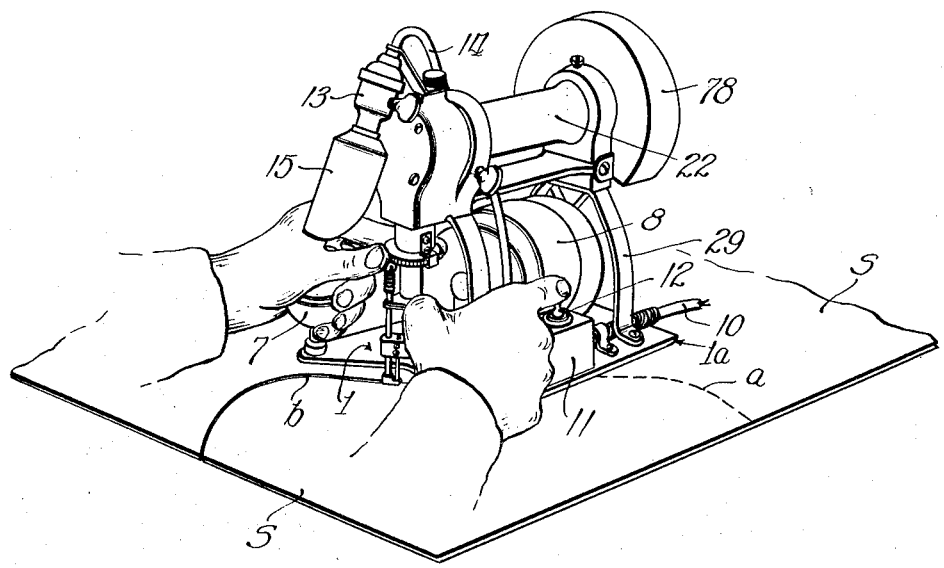
Fig. 7 is a perspective view of the machine as used for cutting a sheet of material.

In constructing my machine I provide a base 1 in the form of a flat and substantially rectangular plate, the edges of which are rounded upwardly and outwardly at 1a. This plate is provided, in its forward end, with a cut-out or recess 2 of substantially V shape, forming projections 3 which extend forwardly from the body of the plate. A post 4 is suitably secured in the forward end of each of the projections 3 and this post is provided with an annular collar or shoulder 5 spaced away from the plate. This provides a groove or space 6 between the shoulder and the plate for reception of a member for securing the plate to an associated supporting plate with the machine in inverted position, as disclosed in my co-pending application for Cutting machine and table, Serial No. 297,536, filed August 4, 1928. A knob 7 in the form of a sphere is suitably secured on the upper end of each post 4, these knobs providing hand grips or handles for moving the machine over the material being cut. It will be noted that these handles are disposed at the forward end of the machine and adjacent each side thereof, thus giving accurate control of the machine in manipulation thereof.

An electric motor 8 of suitable type is mounted upon the upper face of base plate 1 centrally thereof, the axis of this motor being preferably in the vertical plane of the longitudinal axis of the plate. The motor is secured to the plate in a suitable manner, as by means of two or more screws 9 (Fig. 8), which pass through the plate and screw into the base 8a of the motor, the heads of these screws being countersunk in the under face of the plate. Current is supplied to motor 8 by means of a suitable cord or cable 10 provided at its free end with a plug member (not shown) for connecting the motor into an electric circuit in a known manner. The cord or cable 10 is connected to the motor through a switch 11 of known type which is controlled by a finger lever 12. This finger lever is adapted and disposed to be readily operated by the forefinger of a hand grasping the right hand handle 7, as shown in Fig. 7. Preferably the switch 11 is of a known type which permits two or more speeds of operation of the motor, the motor circuit being opened when the finger lever 12 is in vertical position. I also preferably provide a lamp socket 13 of known type connected by a cord 14 to the cord or cable 10 around switch 11. This socket is adapted to receive a suitable lamp globe (not shown), and carries a hood 15 for reflecting the light downwardly onto the line of the pattern to facilitate accuracy in cutting of the pattern. The socket 13 is carried by a bracket 13a mounted on a screw stud (not shown) projecting upwardly from a boss 14a of the frame supporting the cutting tool operating means. A thumb nut 15a threads upon the stud and cooperates with the upper end of boss 14a for clamping the end of the bracket and holding it in desired position.

A pulley 16 is secured on the motor shaft 17, which projects rearwardly of the motor. The pulley is preferably provided with a covering 18 of cork or other suitable friction material. A fabric belt 19 passes about pulley 18 and about a pulley 20 secured on a drive shaft 21 (Fig. 1) which is mounted for rotation in a cylindrical casing 22. This casing is mounted at its ends for turning movement in housings 23 and 24 provided at the ends of a U-shaped frame 25. The casing 22 is held in adjustment by a thumb screw 26 which screws into the housing 24 and a suitable knob or handle 27 is secured to the casing 22 for effecting adjustment thereof. The manner and purpose of adjusting the casing 22 is disclosed in detail in the co-pending application of Arthur H. Woodward, for Cutting means, filed July 26, 1929, Serial No. 381,534. The frame 25 is supported by front and back bows 28 and 29, respectively, which are secured to the housing in a suitable manner, as by screw means. These bows are turned outwardly at their lower ends to provide foot elements 30, which are bored and threaded for securing screws 31 (Fig. 8) which pass through the base plate 1 from beneath the same, the heads of these screws being countersunk in the under face of the base plate. The bows are disposed adjacent the ends of motor 8 and support the frame 25 above the motor, the axis of casing 22 being in a common vertical plane with the longitudinal axis of the motor 8 and the longitudinal axis of the plate 1.

This provides a very compact arrangement in which the weight of the machine is distributed in such manner as to facilitate movement of plate 1 over the material, the center of gravity being low, assuring ease in manipulation of the machine.

Shaft 21 extends into housing 24 and is provided at its forward end with a flanged head 32 (Fig. 2). A block 33 is supported in the head 32 for movement diametrically thereof and is secured to the head for rotation therewith, in a suitable manner. This block carries a crank pin 34 which is disposed eccentrically to head 32. This pin is connected by a connecting rod 35 to a plunger 36 (Fig. 3) which is mounted for reciprocation in a reduced neck 37 depending from a ferrule 38 secured in a downwardly extending collar 39 of the housing 24. This ferrule is interiorly threaded, at its lower portion, for reception of a follower 40 for compressing suitable packing material 41 between the follower and the lower end of the ferrule about the plunger 36 to prevent escape of an excessive amount of lubricant about the plunger. The housing 24 is adapted to receive and retain a suitable lubricant, such as a light grease, and is normally closed by a plate 42 and a gasket 43 secured to the front of the housing by screws 44 passing through the plate and the gasket and threading into suitable lugs 45 projecting inwardly from the sides of the housing.

A sleeve 46 is mounted for turning movement upon the depending neck 37 of ferrule 38. A disc 47 is secured upon the upper end of this sleeve and provides, in effect, a relatively wide annular flange extending completely about the sleeve.

The periphery of this disc is suitably roughened, as by being knurled or serrated, to facilitate manipulation of the disc. A suitably shaped retaining clip 48 is secured to collar 39, at one side of the housing 24 by means of screws 49, or in any other suitable manner. This clip fits about and beneath the disc 47 so as to hold the same against downward movement while permitting ready turning thereof. A suitable washer 50 is preferably provided between the upper end of sleeve 46 and the lower end of ferrule 38. This washer cooperates with the clip to hold sleeve 46 against undesirable looseness or play in a vertical direction. As will be noted more clearly from Fig. 7, the disc 47 is so disposed as to be readily grasped by the thumb and the forefinger of the hand gripping the left hand handle 7 of the machine in the operation thereof. This permits the sleeve 46 to be turned about the plunger 36 into any desired position relative thereto for adjusting the cutting tool.

A short thimble 51 is secured to disc 47 at the under face and adjacent the periphery thereof. This thimble is slotted vertically at 52 for reception of a pin 53 secured through a presser-bar 54, the upper end portion of which is mounted for sliding movement in the thimble. This bar is slidable through an arm 55 secured on the lower end of sleeve 46 and projecting radially therefrom. The bar 54 is also slidable through a tool holder in the form of a block 56 which is mounted upon the lower end of plunger 36 and is confined against movement relative thereto between a collar 57 at the upper face of the holder and a washer 58 at the lower face of the holder held in position by a nut 59 threaded upon a screw stud 60 at the lower end of the plunger.

This holder 56 is provided with a suitable socket member 61 shaped for reception of the shank of the tool, securing screws 62 threading through the holder 56 and the socket member 61 for contact with the tool shank for releasably securing the tool in the holder. A presser-foot 63 is secured upon the lower end of the presser-rod or bar 54, this foot being bifurcated to accommodate the cutting tool. I contemplate using either a saw or a chisel with this machine. When the machine is moved over the work a chisel 64 may be used, the blade of this chisel operating between the fingers of the presser-foot 63, and the shank of the chisel being secured in the member 61 by screws 62. I also provide a suitable saw blade which may be secured in the same manner as chisel 64. The teeth of this blade are so directed as to engage and cut the material when the blade is moved downwardly or away from the machine, but do not engage or cut the material on the up stroke. This blade is thus adapted for sawing material over which the machine is slid or moved.

Figure 8:
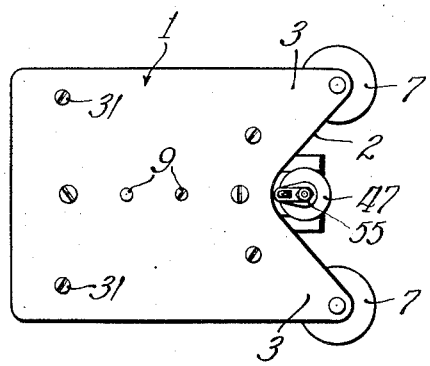
Fig. 8 is an underneath view of the machine.

As will be noted more clearly from Figs. 7 and 8, the cutting tool or chisel and the presser-foot are disposed in the vertex portion of recess 2 and at the transverse center of the base plate 1. In using the machine, when cutting with the chisel, it is supported upon the material to be cut by means of the base plate 1, the front portion being held raised to hold the chisel out of contact with the work, by grasping knobs 7. Disc 47 is grasped between the thumb and the forefinger of the left hand and the switch is closed by the forefinger of the right hand. This closes the motor circuit and causes the chisel to be reciprocated at high speed. The forward portion of the machine is then lowered so as to bring the chisel into cutting relation to the work. As the machine is thus lowered, the chisel is adjusted, by means of disc 47, so as to start the cut accurately on the line of the pattern. In this manner the chisel is inserted into the work accurately on the line of the pattern at the initiation of the cutting operation. The machine is then slid over the work S, by means of knobs 7, so as to cause the tool to cut along the line a of the pattern, as at b. The presser-foot 63 contacts the work or sheet of material S and trails the tool holding it accurately to the line a. It is to be noted that the under face of base plate 1 is flat or planar and smooth, and is of great area relative to the base of the motor and the cutting mechanism so that the weight of the machine is distributed over a relatively great area permitting the plate to be slid over the work. As clearly illustrated in Figure 8, the main or body portion of plate or base 1 is approximately square, the width of such portion being nearly equal to its length. This plate can, therefore, be moved over the material being cut with equal facility in all directions. The sheet S being cut, is supported upon a lower, thicker layer or sheet S' of suitable material, such as composition board or thick cardboard, into which the cutting edge of the chisel enters after it passes through the sheet S. This chisel is reciprocated at high speed, the cutting strokes of the chisel being in the direction indicated by the full line arrow of Fig. 6, that is, downwardly and the chisel is completely withdrawn from the sheet on the upstroke. The material being cut offers a certain resistance to the chisel and this creates a reaction which creates pressure upwardly, tending to raise the plate 1 from the material S. In this connection, it is particularly pointed out that the connection between plate 1 and casing 22 is unyielding and free from all looseness or play. This assures that the chisel will react positively upon plate 1 and exert an appreciable lifting effect upon the plate or base.

The direction of this reaction is indicated by the dotted line arrow of Fig. 6. As a result of this reaction resulting from the use of a reciprocating cutting tool, the plate can be readily slid over the material being cut during operation of the machine. I thus utilize the reaction of the reciprocating tool to advantage in rendering it possible to mount the entire machine upon a base plate of appreciable area and to slide this plate over the material being cut in any desired direction to cause the cutting tool to follow the line of the pattern.

When using the machine for sawing, the chisel is replaced by a suitable saw blade. As previously stated, this blade is adapted to engage and cut the material on the down stroke only. In starting the sawing operation, the work or sheet of material is supported in a suitable manner to provide proper clearance, beneath the work, for the saw blade. The machine is then disposed with base plate 1 flat upon the upper face of the sheet, the saw blade being located beyond and adjacent one edge of the sheet, from which the cut is to be started. The motor circuit is then closed so as to reciprocate the saw blade and the machine is slid upon the work to bring the saw blade into cutting engagement therewith on the line of the pattern. During this movement of the machine, the saw blade is adjusted by means of disc 47 so as to enter the work properly and accurately upon the line. The machine is then moved over the work to cut out the pattern in the same manner as when using the chisel.

If desired, when using the saw blade, the cut may be started remote from the edge of the work by boring a suitable opening through the sheet of material, for the blade. It is, however, usually preferable to start the cut at the edge of the sheet.

Since the saw blade cuts during its down stroke only, and is reciprocated at high speed, it exerts a reaction, in the same manner as the chisel, which tends to raise plate 1 from the work and greatly facilitates movement of the machine upon the work. This reaction of the cutting tool is supplemented by the vibration incident to the operation of the motor and associated operating mechanism, which vibration is accentuated by the eccentric mounting of certain parts of such mechanism, previously described. While the vibration produced by the motor and operating mechanism is in no respect excessive or of such a degree as to be objectionable, it is sufficient to facilitate movement of plate 1 upon the work. By having the motor 8 mounted directly upon the plate, and positively secured thereto by the screws 9 so as to prevent all looseness or play of the motor, as previously described, the vibrations of the motor act upon the plate to best advantage to promote ease of movement thereof over the work. There is thus an added advantage in mounting motor 8 and associated mechanism upon the base plate.

A holding plate 65 is slidably mounted upon the upper face of arm 55 and in slots provided in the lateral portion of sleeve 46, this plate being bifurcated to straddle the sleeve and slide in such slots. For convenience in operation, the plate is provided, at each end thereof, with a depending finger 66. This plate is also provided with a slot 67 which receives the presser-rod or bar 54.

This bar is provided with a notch 68 into which the wall of the plate, at the inner end of slot 67, engages for holding the bar 54 in raised position. Normally, in the operation of the machine, the bar 54 is released and the presser-foot 63 is yieldingly held against the upper face of the material by an expansion coil spring 69 mounted about bar 54 and confined between the lower end of thimble 51 and a collar 70 mounted about the bar and held against downward movement thereon by a pin 71 secured through the bar. When using the machine for cutting sheet material with a chisel or other suitable tool, by movement of the machine over the material, the presser-foot 63 is yieldingly held in contact with the upper face of the material to guide the cutting tool and to hold the material down adjacent such tool facilitating the cutting operation. It is sometimes desirable, however, to hold the presser-foot 63 in inoperative position out of contact with the work. This is true, for example, when the machine is secured in inverted position and is held stationary, a saw blade being secured in the holder 56 and the material being sawed being moved relative to the saw blade or tool.

In my co-pending application above identified, I have shown a cutting machine similar to that disclosed herein and supporting means therefor whereby the machine is mounted to be used for sawing material which is moved relative to the machine.

It is desirable that the belt 19 be maintained under sufficient tension to assure proper drive of the pulley 20. For this purpose a suitable belt tightener is provided. This tightener comprises a flanged wheel 72 rotatably mounted on a pin 73 secured in the upper end of an arm 74 provided, at its lower end, with a pin 75 secured therein and rockably mounted through the arms of a U-shaped bracket 76 suitably secured to base 1. A wire spring 77 is mounted about pin 75 and has one end bearing on base 1, this spring having its other end extended and shaped to form a presser arm bearing against one edge of arm 74 and yieldingly urging it toward pulley 16. The wheel 72 bears upon the belt and maintains it under tension in a known manner.

I also provide a hood or guard 78 about pulley 20. This guard is formed of sheet metal and is provided with integral tabs 79. These tabs receive securing screws 80 which thread into the housing 23 and secure the hood to the housing.

What I claim is:—

1. In a cutting machine, a base having a smooth planar under surface adapted to seat flat upon and slide over material being cut, a tool supported upon said base and having reciprocating motion, and means for driving said tool, said driving means being positively connected to the base for imparting thereto vibrations incident to operation of the tool.

2. In a cutting machine, a base having a smooth planar under surface adapted to seat flat upon and slide over material being cut, a tool supported upon said base and having reciprocating motion perpendicular to the plane of said base, and means for driving said tool, said means being positively connected to the base for exerting a lifting effect thereon by the reaction of the tool incident to the cutting of the material being operated upon.

3. In a cutting machine, a base having a smooth planar under surface adapted to seat flat upon and slide over material being cut, said base being adapted for both lateral and endwise movement over the material, a tool supported upon said base and having reciprocating motion, and means for driving said tool, said means being positively connected to the base and the motion of said tool causing vibration of said base.

4. In a cutting machine, a base having an under surface adapted to slide over material to be cut, said base being adapted for both lateral and endwise movement over the material, a swiveling tool, and means carried by the base for reciprocating said tool.

5. In combination in a cutting machine, a base adapted to seat upon and slide over material being cut, and cutting mechanism mounted on and positively connected to said base, the operation of said mechanism imparting vibration to the base whereby the movement of the machine over the material being cut is facilitated.

6. In combination in a cutting machine, a base adapted to seat upon and slide over material being cut, a cutting tool mounted on the base for reciprocation perpendicularly to the plane thereof, and mechanism for operating the tool mounted on and positively connected to the base, said mechanism imparting vibration to the base and the reaction of the tool exerting a lifting effect upon the base whereby movement of the machine over the material being cut is facilitated.

7. In combination in a cutting machine, a base adapted to seat upon and slide over material being cut, cutting mechanism mounted on said base, and a motor also mounted on the base and driving said mechanism, said mechanism and the motor being positively connected to the base, the operation of said motor and the operating mechanism imparting vibration to the base whereby the movement of the machine over the material being cut is facilitated.

8. In a cutting machine of the character described, a base having a smooth planar under surface adapted to seat upon and slide over material being cut, said base having forwardly extending projections, a reciprocably mounted tool holder supported by the base and disposed to operate between said projections, and handles secured to and extending above the projections of the base.

9. In a cutting machine of the character described, a base plate having a flat under face, a supporting frame mounted upon and above said plate, said frame being positively connected to the plate, a plunger reciprocably mounted in said frame, a tool holder connected to the plunger for reciprocation therewith, a motor mounted on and positively secured to the plate, and driving connections between said motor and the plunger.

10. In a cutting machine of the character described, a base plate having a flat under face, a supporting frame mounted upon and above said plate, said frame being positively connected to the plate, a plunger reciprocably mounted in said frame for movement perpendicular to the plane of the plate, a tool holder carried by the plunger for movement therewith, said holder being connected to the plunger for relative movement about the same and having tool receiving and securing means eccentric to said plunger, a yieldingly pressed guide member connected to the tool holder remote from the plunger and disposed and adapted for contact with the material being cut, a motor on and secured to the plate, and driving connections between said motor and the plunger.

11. In a cutting machine of the character described, a base plate having a flat under face, a supporting frame mounted upon and above said plate, said frame being positively connected to the plate, a plunger reciprocably mounted in said frame for movement perpendicular to the plane of the plate, a tool holder carried by the plunger for movement therewith, said holder being connected to the plunger for relative movement about the same and having tool receiving and securing means eccentric to said plunger, a motor on and secured to the plate, and driving connections between said motor and the plunger.

12. In a cutting machine of the character described, a base plate having a flat under face, a motor mounted on and secured to the plate, a reciprocably mounted plunger supported by the plate, a tool holder carried by the plunger for movement therewith and connected to the plunger for relative movement about the same, said holder having tool receiving and securing means eccentric to the plunger, and driving connections between the motor and the plunger.

13. In a cutting machine of the character described, a base having a smooth planar under face adapted to seat flat upon and slide over material being cut, a tool supported upon the base for reciprocation, and means upon the base for driving the tool, the base being of proper area to support the weight of the parts carried thereby and to slide with facility over the material being cut, the base being of appreciable width relative to its length and movable both laterally and lengthwise over the material operated upon.

14. In a cutting machine of the character described, a base having a smooth planar under face adapted to seat flat upon and slide over material being cut, a swiveling tool supported upon the base for reciprocation, and means upon the base for driving the tool, the base being of proper area to support the weight of the parts carried thereby and to slide with facility over the material being cut, the base being of appreciable width relative to its length and movable both laterally and lengthwise over the material operated upon.

15. In a cutting machine of the character described, a base having a smooth planar under face adapted to seat flat upon and slide over material being cut, a tool supported upon the base for reciprocation, and means upon the base for driving the tool, said base being approximately square and of proper area to support the weight of the parts carried thereby and to slide with facility over the material being cut, said base being movable both laterally and lengthwise over the material operated upon.

16. In a cutting machine of the character described, a base having a smooth planar under face adapted to seat flat upon and slide over material being cut, a casing, means supporting the casing above the base and positively connecting it thereto, a motor beneath the casing and secured directly to the base, a drive shaft mounted in the casing and driven from said motor, a plunger driven from the shaft and mounted for reciprocation perpendicularly to the base, and tool holding means connected to the plunger for reciprocation therewith.

17. In a cutting machine of the character described, a base having a smooth planar under face adapted to seat flat upon and slide over material being cut, a frame, supporting members secured to the frame adjacent the ends thereof, said members being secured to the base and supporting the frame above said base, a drive shaft mounted in the frame, a motor mounted on the plate between said supporting members and beneath the frame and having driving connection with the shaft, a plunger mounted on the frame for reciprocation perpendicularly to the base, tool holding means connected to the plunger for reciprocation therewith, and driving connections between the shaft and the plunger.

18. In a cutting machine, a base having a smooth planar under surface adapted to seat flat upon and slide over material being cut in any direction parallel to said material, a tool supported on the base for reciprocation substantially perpendicular thereto and provided at its lower end with a cutting edge disposed to cut the material by impact therewith in the reciprocation of the tool, and driving means including a motor mounted on the base and having driving connection with the tool, the area of the under surface of the base being sufficient to support the weight of the parts carried thereby without interfering with freedom of movement of the base in any direction and upon material being cut by the tool, the length of the stroke of the tool being such that the tool is withdrawn from the work on its return stroke and the reaction of the tool incident to the cutting operation tending to raise the base vertically away from the material so as to facilitate movement of the base over the material while avoiding interference with freedom of movement of the base upon the material in any desired direction.

19. In a cutting machine, a base having a smooth planar under surface adapted to seat flat upon and slide over material being cut in any direction parallel to said material, a plunger supported on the base for reciprocation perpendicular thereto, a tool holder connected to the plunger for reciprocation therewith and turnable about the axis of the plunger, said holder being provided with tool holding means eccentric to the plunger, and driving means including a motor mounted on the base and having driving connection with the plunger.

20. In a cutting machine, a base having an under surface adapted to slide over material to be cut, said base being adapted for both lateral and endwise movement over the material, a plunger supported on the base for reciprocation substantially perpendicular thereto, a tool holder attached to the plunger for reciprocation therewith and turnable about the axis of the plunger, said holder having tool holding means eccentric to said plunger, and driving means mounted on the base and having driving connection to the plunger.

21. In a cutting machine, a base having an under surface adapted to slide over material to be cut, said base being adapted for both lateral and endwise movement over the material, a plunger supported on the base for reciprocation substantially perpendicular thereto, a tool holder attached to the plunger for reciprocation therewith and turnable about the axis of the plunger, said holder having tool holding means eccentric to said plunger, a yieldingly pressed presser member connected to the tool holder outwardly thereof beyond said tool holding means, said presser member being disposed for contact with the material being cut, and driving means mounted on the base and having driving connection to the plunger.

22. In a cutting machine, a base having an under surface adapted to slide over material to be cut, said base being adapted for both lateral and endwise movement over the material, a plunger supported on the base for reciprocation substantially perpendicular thereto, a tool holder attached to the plunger for reciprocation therewith and turnable about the axis of the plunger, said holder having tool holding means eccentric to said plunger, a yieldingly pressed presser member connected to the tool holder outwardly thereof beyond said tool holding means, said presser member being free to turn about the axis of the plunger and disposed for contact with the material being cut, and driving means mounted on the base and having driving connection to the plunger.

23. In a cutting machine, a base having an under surface adapted to slide over material to be cut, said base being adapted for both lateral and endwise movement over the material, a plunger supported on the base for reciprocation substantially perpendicular thereto, a tool holder attached to the plunger for reciprocation therewith and turnable about the axis of the plunger, said holder having tool holding means eccentric to said plunger, a presser member slidable through the tool holder outwardly thereof beyond said tool holding means and disposed for contact with the material being cut, means yieldingly urging said member toward the material being cut, the presser member being free to turn about the axis of the plunger for imparting similar movement to the tool holder, and driving means mounted on the base and having driving connection to the plunger.

VINCENT V. COLBY.